United States Patent [19]

Spinks

[11] Patent Number: 5,740,217
[45] Date of Patent: Apr. 14, 1998

[54] PASSIVE EMERGENCY HYDROGEN MITIGATION SYSTEM FOR WATER-COOLED NUCLEAR REACTORS

[75] Inventor: Norman J. Spinks, Deep River, Canada

[73] Assignee: Atomic Energy of Canada Limited, Ottawa, Canada

[21] Appl. No.: 856,729

[22] Filed: May 15, 1997

Related U.S. Application Data

[63] Continuation of Ser. No. 550,662, Oct. 31, 1995, abandoned.

[51] Int. Cl.$^6$ .............................. G21C 9/00; G21C 15/18
[52] U.S. Cl. .............................................. 376/301; 376/298
[58] Field of Search ............................... 376/300, 301, 376/287, 298, 299, 293

[56] References Cited

U.S. PATENT DOCUMENTS

| | | | |
|---|---|---|---|
| 2,943,921 | 7/1960 | King . | |
| 3,009,867 | 11/1961 | Kinsey | 376/293 |
| 3,168,445 | 2/1965 | Ziegler et al. | 376/283 |
| 3,207,671 | 9/1965 | Kornbichler | 376/283 |
| 3,423,286 | 1/1969 | Weems et al. | 376/283 |
| 3,658,996 | 4/1972 | Frumerman et al. . | |
| 3,666,622 | 5/1972 | Schluderberg | 376/283 |
| 3,791,923 | 2/1974 | Bhan . | |
| 3,929,567 | 12/1975 | Schabert et al. | 376/293 |
| 3,937,651 | 2/1976 | Schabert et al. | 376/293 |
| 3,984,282 | 10/1976 | Kleimola . | |
| 4,008,650 | 2/1977 | Betz . | |
| 4,050,983 | 9/1977 | Kleimola . | |
| 4,131,509 | 12/1978 | Haidlen | 376/283 |
| 4,139,603 | 2/1979 | Weems et al. . | |
| 4,210,614 | 7/1980 | Kleimola . | |
| 4,407,774 | 10/1983 | Schretzmann et al. . | |
| 4,687,626 | 8/1987 | Tong | 376/298 |
| 4,738,818 | 4/1988 | Cantineau | 376/211 |
| 4,780,271 | 10/1988 | Dezubay et al. . | |
| 4,889,682 | 12/1989 | Gou et al. | 376/283 |
| 4,911,879 | 3/1990 | Heck et al. . | |
| 4,948,554 | 8/1990 | Gou et al. | 376/283 |
| 4,959,193 | 9/1990 | Hunsbedt et al. . | |
| 5,049,353 | 9/1991 | Conway et al. . | |
| 5,154,877 | 10/1992 | Schultz et al. . | |
| 5,158,742 | 10/1992 | Dillmann | 376/299 |
| 5,169,595 | 12/1992 | Cooke | 376/299 |
| 5,190,720 | 3/1993 | Hunsbedt et al. . | |
| 5,282,230 | 1/1994 | Billig et al. | 376/283 |
| 5,285,486 | 2/1994 | Cowan, II et al. | 376/301 |
| 5,287,392 | 2/1994 | Cowan, II et al. | 376/301 |
| 5,345,481 | 9/1994 | Oosterkamp | 376/293 |

FOREIGN PATENT DOCUMENTS

| | | | |
|---|---|---|---|
| 3035103 | 3/1982 | Germany | 376/300 |
| 3518174 | 12/1985 | Germany . | |
| 9083086 | 5/1984 | Japan | 376/283 |

OTHER PUBLICATIONS

Proc. Second. Inter. Conf. on the Impact of Hydrogen on Water Reactor Safety, Albuquerque, NM. (Oct. 1982), pp. 1109–1114, Baukal et al.

(List continued on next page.)

*Primary Examiner*—Harvey E. Behrend
*Attorney, Agent, or Firm*—Emrich & Dithmar

[57] ABSTRACT

An improved system for passively removing hydrogen inside containment in a nuclear reactor in the event of a loss of coolant accident by means of catalytic hydrogen recombination. A baffle wall located inside containment is used to establish within containment an air upflow path and an air downflow path in convective exchange. The air upflow is past the area of the coolant lines and is effective to entrain hydrogen from the break and the air downflow path is in the area adjacent the containment wall. The air upflow path downstream of the coolant lines is ducted so as to confine the entrained hydrogen to the ducted air upflow path and catalytic hydrogen recombiners are located in the ducted air upflow path for recombining said entrained hydrogen with oxygen in said ducted air upflow.

4 Claims, 1 Drawing Sheet

OTHER PUBLICATIONS

Atomnaya Energiya, vol. 67, No. 5, Nov. 1989, pp. 335–337, translation, (identified as pp. 821–823), Keller et al.

Proc. Fifth International Conf. on Emerging Nuclear Energy Systems, (ICENES '89), Karlsruhe, Germany, (1989), pp. 19–24, Hennies et al.

G. Koroll et al., "Catalytic Removal of Hydrogen in Humid, Hydrogen–air Gas Streams" taken from Hydrogen behavior and mitigation in water–cooled nuclear power reactors. Proceedings of a workshop held in Brussels (Belgium) from Mar. 4–8, 1991. Edited by E. Della Loggia Commission of the European Communities, Directorate General for Science, Research and Development, Brussels, Belgium 1992.

J. Kolditz, "Sump Water Temperature Rise Improves $H_2$ Mixing", Nuclear Engineering International, pp. 28–29, May 1995.

W.P. Beck et al., "Candu Passive Heat Rejection Using the Moderator" International Conference on New Trends in Nuclear System Thermohydraulics, Pisa, May, 1994.

F.J. Erbacher et al., Passive Containment Cooling by Natural Air Convection for Next Generation Light Water Reactors;, Nureth–5, Salt Lake City, 1992.

M. Gavrilas et al., "Gothic Code Evaluation of Alternative Passive Containment Cooling Features" presented in Toronto, Canada, Oct. 21, 1994, Third International Conference on Containment Design and Operation.

S.N. Tower et al., "Passive and Simplified System Features for the Advanced Westinghouse 600 MWe PWR", Nuclear Engineering and Design, 109 (1988), pp. 147–154.

PASSIVE EMERGENCY HYDROGEN MITIGATION SYSTEM FOR WATER-COOLED NUCLEAR REACTORS

This is a continuation of application Ser. No. 550,662, filed Oct. 31, 1995, now abandoned.

FIELD OF THE INVENTION

This invention relates to an improved system for passively removing hydrogen inside containment in a nuclear reactor in the event of a loss of coolant accident by means of catalytic hydrogen recombination.

BACKGROUND OF THE INVENTION

Conventional water-cooled nuclear reactors are designed to minimize the threat to the integrity of containment due to a loss-of-coolant accident ("LOCA"). A LOCA can give rise to two distinct problems. First, a break in the reactor coolant circuit leads to the ejection of hot water and steam into the containment atmosphere. Unless systems are employed to remove heat from containment, the pressure and temperature within containment can rise beyond the design limits of the containment vessel. Second, in a severe LOCA involving not only loss of coolant but also failure to inject emergency coolant into the coolant system, the resulting increase in fuel temperature leads to a high temperature reaction between the residual steam in the primary system and the zirconium in the fuel sheathing. In serious cases, complete oxidation of the fuel sheathing may occur. The reaction is exothermic and produces hydrogen. The hydrogen produced from the reaction escapes along with steam from the break point in the primary system into containment atmosphere. In a severe accident, the mass; release rate of hydrogen can be in the order of a kilogram per second. Unless systems are employed to maintain hydrogen concentrations below self ignition limits, a potentially explosive gas mixture can be created in the reactor containment.

New designs of water-cooled nuclear reactors avoid reliance on electrical supplies, service water and operator action in mitigating the effects of a LOCA. Such designs employ passive means to transferred heat from containment atmosphere through the containment walls in order to maintain containment pressure within design limits. For example, steel containment walls and external water cooling from elevated tanks are used to promote heat transfer. Heat from containment atmosphere is transferred to the containment walls by natural convection. Hot steam from the break mixes with air and rises to the top of containment and is cooled by contact with the cold containment wall. The cooler denser mixture falls and a process of natural circulation is begun wherein flow near the walls is down and flow in the central area is up. After the initial blow-down period, the pressure and temperature within containment increases until the rate of condensation of steam on the cold containment wall, and any other cool surfaces, equals the rate of steam discharge from the break.

Conventional reactor design employs a variety of means to mitigate hydrogen build-up. Pre-inerting is one means and involves the generation of an oxygen-depleted atmosphere in containment before or during start-up for normal plant operation. An inert gas (usually nitrogen) is injected into containment to substitute for air that is simultaneously let out to ambient and to reduce the oxygen concentration below the level needed for hydrogen combustion. Pre-inerting is usually applied only to small containments in view of practical difficulties inherent in large designs.

For mid- and larger containment designs, hydrogen igniters are commonly considered for hydrogen mitigation. Hydrogen igniters are conventionally distributed throughout containment, particularly in areas of likely high hydrogen concentration. Hydrogen igniters initiate combustion as soon as its concentration exceeds the ignition threshold, thereby removing the hydrogen by slow deflagration while distributing the energy release spatially and temporally. However, there is a risk in the use of hydrogen igniters that deflagration initiated at one location may propagate into a more sensitive region nearby (i.e., nearer to the release point of the hydrogen) or vent to flammable adjacent volumes (so called jet-ignition) and propagate more vigorously than expected. This may lead to transition from deflagration to detonation (TDD) which can induce very high loads to the containment structure and equipment. An additional disadvantage to the method of intentional ignition is the unpredictability of the mixing behaviour and the type of combustion that may result from intentional ignition of the mixture. This uncertainty has fuelled the search for a method of removing hydrogen without deflagration. Further, igniters that rely on AC power could be unavailable in the event of a loss of electrical supply, battery powered igniters are limited to intermittent operation in view of the limited power available and catalytic igniters have limitations relating to the range of mixtures that can be ignited, their response time and their susceptibility to poisoning, fouling or mechanical damage. As a result, it is conventional practice to provide some other means of maintaining hydrogen concentrations below deflagration limits, and to rely on intentional ignition only if such other means are ineffective.

One such other means is the use of hydrogen recombiners. Hydrogen recombiners combine hydrogen and oxygen to produce water, thereby reducing hydrogen concentration in containment. Catalytic recombiners, as opposed to thermal recombiners, are self starting and do not require external power and accordingly can be used as part of a passive system. Although catalytic hydrogen recombiners have been proposed for use in containment, they have not been widely employed in practice due to a number of factors. It is conventional practice in large reactor designs to use containment atmosphere mixing to dilute hydrogen generated at the source of the break throughout containment. This is considered effective as the large containment volume is capable of diluting very large quantities of hydrogen before levels reach deflagration limits. This affords a reasonable period of time within which emergency action can be taken to deal with the LOCA.

In order to operate effectively, hydrogen recombiners require a relatively high flow rate of air. The conventional use of natural circulation of containment atmosphere to effect containment cooling typically does not produce sufficiently high flow rates to render effective passive hydrogen recombiners to deal with large containment volumes. Also, due to the presence of machinery and spaces within containment, the natural convective flow patterns induced by a LOCA are exceedingly difficult to predict or model with the result that choosing optimum locations for passive hydrogen recombiners is an imprecise science at best. As a result, hydrogen recombiners are usually considered for placement in ventilation trunking through which a portion of the containment atmosphere is circulated by fans. This, of course, is not a passive system and is ineffective in the event of a loss of power to drive the circulation fans. Various methods have been proposed to improve the flow of air to recombiners. In DE 3035103, there is disclosed the use of vertical shafts and heating devices in the shafts to improve flow to recombiners by a chimney effect. While the shafts are effective to channel flow to the recombiners, the electric heaters used to generate the upward flow of air rely on external power. In addition, the large shafts present obvious physical difficulties in their integration with the equipment in containment.

In view of their many limitations, hydrogen recombiners have found acceptance only for the routine removal of hydrogen produced from radiolysis and corrosion. For accident control applications, commercial reactors have not heretofore relied exclusively on hydrogen recombiners alone, but instead additionally provide for igniters and/or inserting. There is therefore a need to improve the conditions under which hydrogen can be removed by catalytic recombiners.

SUMMARY OF THE INVENTION

In accordance with one aspect of the invention, there is provided, in a water cooled nuclear reactor having within its containment wall a reactor core and coolant lines associated therewith, a system for removing hydrogen from containment atmosphere generated in the event of loss of coolant accident occasioned by a break in said coolant lines, comprising means for establishing an air upflow path and an air downflow path in convective exchange, said air upflow path disposed in the area of said coolant lines and effective to entrain hydrogen from said break and said air downflow path in the area adjacent said containment wall; means for ducting said air upflow path downstream of said coolant lines effective to confine said entrained hydrogen to the ducted air upflow path; and a catalytic hydrogen recombiner located in said ducted air upflow path for recombining said entrained hydrogen with oxygen in said ducted air upflow.

In accordance with another aspect of the present invention, the means for establishing an air upflow path and said air downflow path comprises a baffle wall disposed between the area of said coolant lines and the outer containment wall and having a lower and an upper aperture, said baffle wall defining an air upflow path from said lower aperture to said upper aperture through the area of said coolant lines and an air downflow path from said upper aperture to said lower aperture in the area between said baffle wall and the outer containment wall.

In accordance with another aspect of the invention, the ducted air upflow path is through a steam generator enclosure.

BRIEF DESCRIPTION OF THE DRAWINGS

The present invention will now be described with reference to the accompanying drawings, wherein.

DETAILED DESCRIPTION OF THE PREFERRED EMBODIMENT

Figure 1:
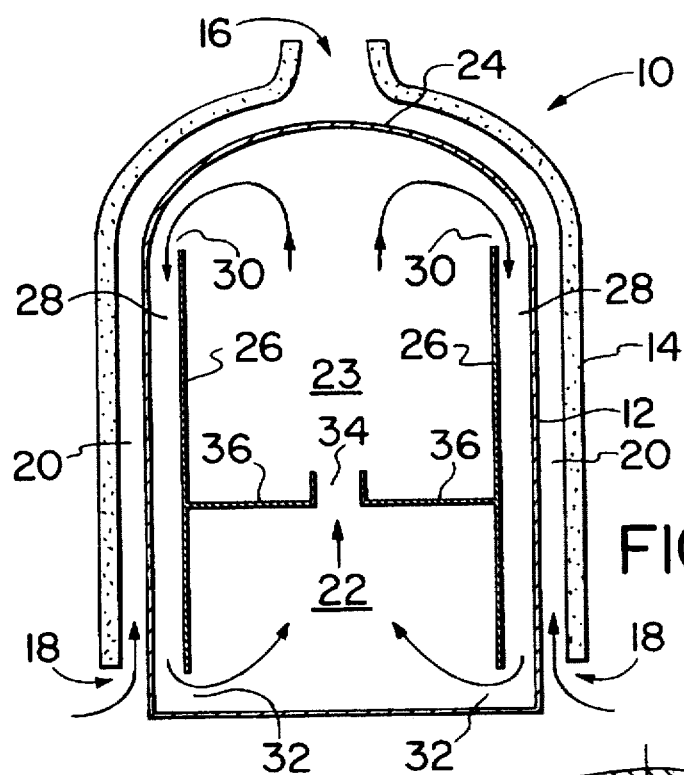
FIG. 1 is a schematic representation of the hydrogen mitigation system of the present invention.

Referring to FIG. 1, a schematic representation of the broad concept of the invention is shown. A reactor building generally indicated by numeral 10 comprises containment wall 12. Outer wall 14 surrounds containment wall 12 and is open at top 16 and bottom 18 and provides an external annular area 20 through which external cooling air can flow by natural convective forces. Containment wall 12 can be made of steel or other heat conductive metal while outer wall 14 is typically made of concrete. While a steel and concrete structure is shown in FIG. 1, the present invention can be used in association with other rejector designs.

A LOCA involves a break in a coolant line. The reactor core is typically located centrally at the bottom of containment and there is a concentration of coolant lines around and above the core. For the purpose of illustration, the area of the coolant lines is generally indicated by the numeral 22 on FIG. 1. Steam from a break in the area of numeral 22 will tend to rise in the central area 23 inside containment and will be cooled by dome 24 and will descend along the inside surface of cool containment wall 12. This sets up a natural convective circulation that transports heat away from the area of the break and out of containment through containment wall 12. Although omitted from FIG. 1 for the sake of clarity, it will be appreciated by those skilled in the art that the area inside containment wall 12 typically houses a large number of machinery spaces including the reactor vault, refueling bays, steam generator enclosures, pump rooms and the like. As a result, the natural convective circulation described above encounters many obstacles with the result that the velocity of circulation is relatively weak and the precise path of flow is difficult to predict.

In accordance with the present invention, the containment volume is divided into an air upflow path and an air downflow path. Baffle wall 26 is located in spaced relation inside containment wall 12 so as to provide an annular space 28 therebetween defining an air downflow path, and a central space 23 defining an air upflow path. The downflow and upflow paths which are separated by the vertically disposed baffle wall 26 are joined near their upper limits by apertures 30 through baffle wall 26 at an elevation above the source of hydrogen 22 and near their lower limits by apertures 32 through baffle wall 26 at an elevation below the source of hydrogen 22. Air upflow in central space 23 can communicate with the air downflow in annular space 28 through upper apertures 30 and air downflow in annular space 28 can communicate with air upflow in central space 23 through lower apertures 32. In practice, the intrusion of equipment and machinery spaces dictates that space 28 defining the air downflow path is not a true annular region and is more likely to comprise a number of irregularly configured spaces located about the periphery inside containment wall 12. As a result, the air downflow path is considerably less unobstructed than shown in FIG. 1. In practice, while the lower apertures 32 can be true apertures formed through baffle wall 26, upper apertures 30 can readily be provided via the open space between the upper limit of baffle wall 26 and dome 24.

By the use of baffle wall 26, the natural convective flow of containment atmosphere is enhanced and channeled producing defined and predictable air upflow and downflow paths. By locating apertures 30 and 32 above and below the area 22 of the hydrogen source, the hydrogen produced is entrained in a strong air upflow path.

The central space 23 in the region above the reactor core is typically filled with equipment and machinery spaces. As a result, a number of discrete air upflow paths will usually exist. In accordance with the present invention, all air upflow paths other than those in which hydrogen recombiners are deployed are blocked off and the air upflow path downstream of said coolant lines is ducted so as to confine the entrained hydrogen to the ducted air upflow path. This can be achieved by configuring or modifying the partitions defining the equipment machinery spaces to channel or duct the air passing over the coolant lines into a single or a limited number of upflow paths in which the hydrogen recombiners are located. Referring to FIG. 1, a simplified representation of partitions 36 is shown which partitions define a single ducted air upflow path 34 immediately downstream of hydrogen source 22 in which recombiners can advantageously be deployed. This confines the entrained hydrogen from the break to the ducted airflow thus ensuring that it passes through the recombiners before undergoing mixing and dilution with containment atmosphere. The strong air upflow created by the use of baffle wall 26 provides excess oxygen for effective recombination with the entrained hydrogen. As a result, the recombiners in the air upflow path 34 have the operating conditions necessary to effectively maintain hydrogen levels within containment at non-deflagration levels. In addition, the heat generated by the exothermic catalytic recombination reaction of hydrogen with oxygen contributes to the upward flow of containment atmosphere past the break and thus assists in promoting the natural convective circulation of containment atmosphere and heat transfer.

Figure 2:
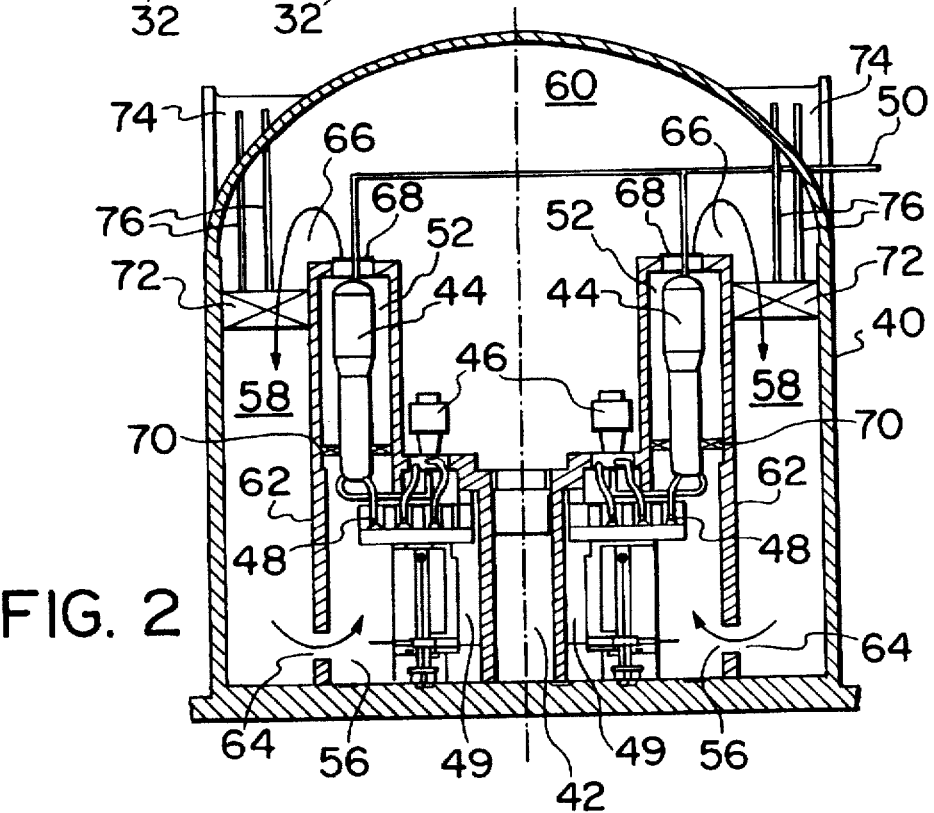
FIG. 2 is a cross-sectional view of a CANDU reactor having the baffle wall and hydrogen recombiners of the present invention.

Referring now to FIG. 2, the application of the present invention to a CANDU reactor is shown. The reactor comprises generally containment shell 40, which encases a reactor core 42 and steam generators 44. In the primary system, coolant from core 42 is circulated to steam generators 44 and back to core 42 by pumps 46 through coolant lines, which coolant lines can include headers, generally designated by numeral 48 and feeders connected to individual fuel channels in core 42 through feeder cabinets 49. Heat extracted from the coolant produces; high pressure steam in steam generators 44 which is passed out through main steam line 50 to steam turbines (not shown).

The containment volume is comprised of an inaccessible area, an accessible area and a dome area. Baffle wall 62 separates the inaccessible area from the accessible area. The centrally disposed inaccessible area generally includes steam generator enclosures 52, fueling machine vaults 56, the areas adjacent headers 48 and feeder cabinets 49. The annular or part annular accessible area is generally designated by numerals 58 and includes various machinery spaces. The dome area is generally designated by the numeral 60.

In accordance with the present invention, baffle wall 62 is provided with lower apertures 64 at a low elevation to permit atmosphere to communicate between accessible area 58 and the fueling machine vaults 56. Similarly, baffle wall 62 has upper apertures 66 to permit atmosphere from the central inaccessible area to communicate with the accessible area 58 through the upper end of steam generator enclosure 52, and dome area 60 as described more fully below. As is evident from FIG. 2, baffle wall 62 is in effect a modified structural wall within containment and is not necessarily continuous about the periphery inside containment. As a result, the "annular" accessible area 58 between baffle wall 62 and containment wall 40 is irregular in shape and can be a series of discrete spaces located about the periphery inside containment. In the alternative, baffle wall 62 can be formed in a crane wall or other vertically disposed partition wall. As is also evident from FIG. 2, upper apertures 66 are in fact the space above the upper limit of baffle wall 62 which is in communication with the inaccessible area.

In the initial phase of blowdown after a LOCA, the fuel is maintained adequately cool. Within several minutes, however, and with loss of emergency coolant, the fuel temperature will have increased sufficiently that hydrogen will have started to be produced and released into containment atmosphere. This delay is significant because it allows sufficient time for the natural convective circulation of air and steam to become established prior to the release of hydrogen. When the hydrogen is released, it will begin to circulate with the air and steam in the flowpath established by natural convection.

In a LOCA, the most likely location of the break will be in headers 48 or in the feeders in feeder cabinets 49. Immediately after the accident occurs, steam and hot water will rapidly escape from the break site. The steam will mix with the air and rapidly fill the region of fueling machine vault 56 and will rise up through steam generator enclosures 52 and into the dome area 60 via panels 68 which open at the top of the steam generator enclosures 52. The hot mixture will make contact with the cool inside surfaces of dome area 60 and the upper portions of containment wall 40 and will start to cool and condense. The cooled and denser steam and air mixture will descend in the annular area 58 over the inside surface of containment wall 40 and begin a process of natural circulation whereby the flow of the steam and air mixture in the accessible area 58 is downward and will pass into the inaccessible area through lower apertures 64 and the flow of air in the central inaccessible area is upward.

Containment wall 40 has a limited thermal capacity and the natural convective circulation within containment will abate unless other measures are taken to remove heat from containment atmosphere in the annular area 58 defining the air downflow path of the present invention. This removal of heat can be done in a number of ways that are known to those skilled in the art. For example, for reactor designs employing a steel containment, it is known to provide cooling water from an elevated external tank to the outside surface of containment to improve heat rejection. This is often coupled with enhanced air circulation over the outside wetted surface of containment by external walls such as those schematically illustrated and identified by numeral 14 in FIG. 1. In the alternative, as shown in FIG. 2 and as disclosed in U.S. Pat. No. 5,661,770, which is incorporated herein by reference, heat transfer and natural convection within containment can be enhanced by means of a heat exchanger in the form of a tube bank 72 located at an elevated position in annular space 58 adapted to transfer heat from containment atmosphere to an external elevated pool of water 74 through lines 76 by convective flow within the heat exchanger tubes.

Baffle wall 62 greatly promotes the natural convective circulation of containment atmosphere and ensures a well developed air upflow path past the area of the coolant lines. The air upflow path immediately downstream of the area of the feeder cabinet 49 and headers 48 where the hydrogen source would most likely be, is confined to steam generator enclosures 52. In accordance with the present invention, hydrogen recombiners 70 are located in the air upflow path immediately downstream of the source of hydrogen and can advantageously be located in steam generator enclosures 52. As shown in FIG. 2, recombiners 70 are deployed across each steam generator such that the air upflow path therein must pass through the recombiners before exiting to the dome area 60 through open panel 68.

To ensure that the air upflow path does not bypass recombiners 70, any alternative upflow path other than steam generator enclosures 52 is blanked off. In conventional reactor construction, the bulkheads and deckheads located above the coolant lines usually blank off, or can be configured or modified to blank off any such alternate flow path. If the steam generator enclosures of the reactor are not convenient for reasons such as limited access, an alternate upflow path or paths can be engineered to specifically accomodate the recombiners.

Lower apertures 64 in baffle wall 62 can be sealed during normal operations by panels (not shown) to prevent circulation of air from the inaccessible to the accessible regions. On a LOCA signal, such panels, along with panels 68 at the top of the steam generator enclosure 52, can be mechanically opened or permitted to blow out by the rise in pressure, permitting the circulation of containment air therethrough. In the alternative, such panels can be eliminated and lower aperature 64 can be formed by overlapping the wall portions so as to eliminate any line of sight openings between the inaccessible area in the vicinity of fueling machine vaults 56 and accessible area 58 through which radiation from the reactor could escape. With this arrangement, natural circulation of containment atmosphere will be continuous during normal operations and tube bank 72 or similarly positioned coolers can be used to condense out tritiated steam and thereby reduce levels of tritium that would circulate to the accessible area.

LOCA calculations for CANDU 6 type reactors have indicated hydrogen production rates of up to 2.7 $m^3/s$. By use of baffle wall 62 and elevated tube banks 72, an air and steam upflow rate of at least 85 $m^3/s$ into each of fueling machine vaults 56 is achievable during the period of release of hydrogen. Assuming that all hydrogen from a break mixes with the air upflow in one fueling machine vault 56, the concentration of hydrogen entering recombiners 70 will be about 3.1%. With this air flow, recombiners having an efficiency of about 80% would reduce the hydrogen concentration to below about 0.6% at exit from the recombiners. Eventually the recirculating air and steam would have a 0.6% hydrogen concentration making a total hydrogen concentration of up to about 4% at the entrance to the recombiners. This is less than the deflagration limit of about 5% and is well below the detonation limit.

For a given air flow rate, the smaller the recombiner flow area the higher the efficiency. However, too small a flow area will lead to a large pressure drop and a sufficient air flow will not be achieved. In addition, a small recombiner flow cross-section could result in unacceptably high force on the recombiners during blowdown. The appropriate calculations to size the recombiner flow area for a given air upflow rate and hydrogen concentration are well known in the art. For CANDU type reactors, a recombiner flow cross-section in the order of 10 $m^2$ per steam generator enclosure is indicated.

As will be understood by those skilled in the art, hydrogen concentrations upstream from the recombiners near the break could exceed deflagration levels, but a deflagration near the break would be limited by the amount of hydrogen in this limited volume. In addition, hydrogen exiting the recombiners could reconcentrate in reactor dome area 60 and this may indicate the need for additional recombiners to be conventionally distributed in this area.

Minor changes to the location of some of the piping susceptible to a break in a LOCA may be necessary to ensure that any potential hydrogen source is immediately downstream of the recombiners. For example pressure relief piping associated with a pressurizer (not shown) normally exits the pressurizer at the top, an elevation which would be higher than the desirable elevation for the recombiners. Hydrogen from a break in this pipe would either bypass the recombiners or be trapped. To overcome this potential problem, the pressure relief piping can be brought down through the interior of pressurizer and out through its bottom at an elevation below the recombiners. Other similar adaptations can be made as required depending on the precise architecture of the nuclear reactor facility to which this invention is applied.

While the present invention has been described in association with the AECL CANDU pressurized heavy water reactor, it may be applied, with suitable modification to conventional reactor designs including pressurized light water reactors.

We claim:

1. In a water cooled nuclear reactor having within its outer containment wall a reactor core and coolant lines associated therewith and at least one steam generator enclosure, a system for removing hydrogen from containment atmosphere generated in the event of loss of coolant accident occasioned by a break in said coolant lanes, comprising:

means for establishing within containment an air upflow path and an air downflow path in convective exchange, path between said containment wall and said baffle wall at an elevation near said upper end of said baffle wall and in convective heat exchanger relation with an elevated pool of water said air upflow path disposed in the area of said coolant lines and effective to entrain hydrogen from said break and said air donwflow path in the area adjacent said containment wall, said means comprising a baffle wall disposed between the area of said coolant lines and the outer containment wall and having a lower and upper aperture, said baffle wall defining an air upflow path from said lower aperture to said upper aperture through the area of said coolant lines and an air downflow path from said upper aperture to said lower aperture in the area between said baffle wall and the outer containment wall;

means for ducting said air upflow path downstream of said coolant lines effective to confine said entrained hydrogen to the ducked air upflow path, said means for ducting comprising structural members located at an elevation above said coolant lines configured to duct said air upflow through said at least one steam generator enclosure and blank off alternative air upflow paths; and at least one catalytic hydrogen recombiner located in said at least one steam generator enclosure such that said ducked air upflow path passes therethrough for recombining said entrained hydrogen with oxygen.

2. The system of claim 1 wherein the lower aperture and the steam generator enclosure are normally closed to air flow therethrough by blow-out panels adapted to open in the event of a pressure rise produced by a loss of coolant accident.

3. The system of claim 1 wherein said upper aperture is located at an elevation above said coolant lines and said lower aperture is located at an elevation below said coolant lines.

4. The system of claim 1 further including a heat exchanger for removing heat from said air downflow path between said containment wall and said baffle wall at an elevation near said upper end of said baffle wall and in convective heat exchange relation with an elevated pool of water.

* * * * *

UNITED STATES PATENT AND TRADEMARK OFFICE
CERTIFICATE OF CORRECTION

PATENT NO.    : 5,740,217
DATED         : April 14, 1998
INVENTOR(S)   : Norman J. Spinks It is certified that error appears in the above-indentified patent and that said Letters Patent is hereby corrected as shown below:

IN THE CLAIMS

Claim 1

Column 8, line 17, delete "lanes" insert -- lines --;

Signed and Sealed this

Sixteenth Day of June, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.    : 5,740,217
DATED         : April 14, 1998
INVENTOR(S)   : Norman J. Spinks It is certified that error appears in the above-identified patent and that said Letters Patent is hereby corrected as shown below:

<u>Column 8,</u>
Line 17, delete the word "lanes" and insert -- lines --;
Lines 21-23, delete the words "path between said containment wall and said baffle wall at an elevation near said upper end of said baffle wall and in convective heat exchanger relation with an elevated pool of water";
Line 25, delete the word "donwflow" and insert -- downflow --;
Lines 37 and 45, delete the word "ducked" and insert -- ducted --.

Signed and Sealed this

Third Day of June, 2003

JAMES E. ROGAN
*Director of the United States Patent and Trademark Office*